United States Patent Office 3,010,913
Patented Nov. 28, 1961

3,010,913
CATALYST PREPARATION
Jerry L. Price, La Marque, Tex., assignor to Monsanto Chemical Company, St. Louis, Mo., a corporation of Delaware
No Drawing. Filed Sept. 23, 1957, Ser. No. 685,368
7 Claims. (Cl. 252—441)

This invention relates to the preparation of copper salt catalysts useful in oxidation of hydrogen chloride and in the oxidative chlorination of hydrocarbons. More specifically, it concerns an improved method of preparation of cupric halide catalysts and the utilization of the catalysts so prepared in an oxidative chlorination process.

Chlorination of hydrocarbon gases with hydrogen chloride and air or oxygen is a well known process. Suitable catalysts are customarily employed to accelerate the reaction. The catalysts usually employed comprise the salts, particularly the halides, of metals having variable valences. These salts have been used as such, in combination with various promoting substances, and in combination wtih or disposed upon mineral substances such as asbestos, diatomaceous earth, pumice, clay, kieselguhr, alumina, silica, and the like. A particularly effective catalyst comprises a copper halide which is in combination with or disposed upon an alumina, or a catalyst composition containing the copper halide as the active catalytic agent impregnated on alumina. The process has generally been carried out by passing a mixture of hydrogen chloride, oxygen or air, and the hydrocarbon through a reaction chamber containing a stationary or fixed bed of the catalyst. More recently, however, the catalyst has come to be employed in a finely divided state according to the so-called fluidized catalyst technique. The main disadvantage of the copper halide catalysts is that they are volatile at the required reaction temperatures. Thus, the catalyst mass is unable to retain its activity over an extended period of time because of loss of the copper halide and it must be continually replaced or recovered and returned to the reaction zone. The problem of catalyst losses is aggravated when the catalyst is employed in the fluidized state. Because of the larger surface resulting from the subdivision of the catalyst particles, loss of the copper halide is even more pronounced and catalyst life is even shorter.

The common procedure for incorporating the copper halide on the active carrier comprises impregnating the carrier in the form of granules, pellets, or finely divided particles with an aqueous solution of the copper halide and then drying the mixture at the desired temperature. It has now been discovered that a copper halide catalyst supported on a carrier such as alumina can be prepared which does not suffer from the disadvantages of those of the prior art. A much improved catalyst is produced if the carrier is impregnated with a solution of the copper halide in an alcohol and thereafter dried. With the catalyst prepared from an alcoholic solution, the oxidative chlorination reaction may be advantageously conducted at lower temperatures. Catalyst activity is such that improved yields and conversions may be obtained at a temperature level at which high losses of the copper halide by volatilization and any excessive combustion losses are avoided. The improved catalyst of the invention has an extended catalyst life resulting in high yields of chlorinated hydrocarbon products per unit of catalyst cost. In addition, the method of preparation is essentially simpler requiring less operating equipment. Another important advantage lies in the relative non-corrosivity of the alcohol-prepared catalysts. The usual severe corrosion problems encountered in the preparation of the catalysts from water solutions do not arise using the method of the invention. This, of course, obviates the necessity for using special corrosion-resistant materials of construction in the catalyst preparation plant. The natural consequence is a more economical process from the standpoint of capital cost as well as operating expense. In addition, the corrosion problems in the oxidative chlorination process are drastically reduced by virtue of the lower operating temperatures made possible by use of the catalysts prepared by the present method.

According to the invention, improved catalytic compositions containing a cupric halide as the active constituent deposited on a carrier such as alumina are prepared by dissolving the cupric halide and any halides associated therewith in an alkyl alcohol containing from 1 to 8 carbon atoms, thoroughly admixing the carrier with said solution, separating the solids from the liquid in the mixture, drying said solids, and converting them into any desired form by grinding, pelletizing, etc.

The invention is illustrated in the following examples which are not, however, to be construed as limiting its scope in any manner except as it is limited in the attached claims. All parts given are by weight.

EXAMPLE I

A batch of cupric chloride catalyst was prepared as follows: Thirty-four parts of $CuCl_2 \cdot 2H_2O$ was dissolved in 58 parts of methanol. To this solution was added 100 parts of alumina (particle size $-48+100$ mesh) and the whole was stirred thoroughly until the mixture had a uniform color. The mixture was allowed to stand for about 5 to 10 minutes then the supernatant liquid was decanted. The remaining slurry was dried in a vacuum oven at a temperature of about 50° C. The resulting catalyst had a packed density of 1.11 g./cc.

A jacketed air-cooled glass reactor about 4 ft. long and having an internal diameter of 2.52 in. was packed to a depth of approximately 2.04 ft. with about 2200 g. of the above-described catalyst. The reactor was heated to the desired temperature by means of wire wrapping on the outside of the jacket and the catalyst was fluidized with air. Hydrogen chloride, ethylene and oxygen (as air) in the molecular ratio of 2:1:0.55 were fed into the bottom of the heated reactor at a velocity of 18 s.c.f.h. with the respective rates being 6.58 s.c.f.h., 3.26 s.c.f.h., and 8.20 s.c.f.h. Contact time between reactants and catalyst in the fluidized system was approximately 8 seconds. Pressure in the reactor was substantially atmospheric.

Dichloroethane and unreacted HCl was recovered from the effluent gaseous product by cooling it and passing it through a series of water scrubbers. Product conversion was calculated on the basis of HCl fed and HCl remaining in the reactor off-gas as determined by titration of the aqueous phase from the water scrubbers with standard caustic solution.

A number of runs were made in this fashion at temperatures ranging from 250° C. down to 180° C. Results of the various runs were tabulated as follows:

| Run No. | Temp., ° C. | Conversion, percent |
|---|---|---|
| 1 | 252 | 81.8 |
| 2 | 248 | 84.5 |
| 3 | 236 | 87.8 |
| 4 | 228 | 90.0 |
| 5 | 221 | 92.3 |
| 6 | 218 | 92.8 |
| 7 | 212 | 94.3 |
| 8 | 206 | 95.8 |
| 9 | 200 | 97.1 |
| 10 | 192 | 98.5 |
| 11 | 179 | 99 |

EXAMPLE II

A catalyst was prepared for use in the oxidative chlorination of ethylene in the conventional manner. Five hundred parts of cupric chloride ($CuCl_2 \cdot 2H_2O$) was dissolved in 1180 parts of distilled water. Alumina (1470 parts) was added to the solution and mixed thoroughly therewith. After the mixture had been allowed to settle, the water was decanted and the resulting slurry was thoroughly dried in a vacuum oven at 50° C.

This catalyst was charged to the reactor described in Example I and fluidized. Using substantially the same conditions and procedure of Example I, a number of runs were made at different temperatures in which ethylene was reacted with hydrogen chloride and oxygen and converted to dichloroethane. Conversions were determined in each case as before and results of the runs were recorded as follows:

| Run No. | Temp., °C. | Conversion, percent |
|---|---|---|
| 1 | 251 | 79.3 |
| 2 | 241 | 84.6 |
| 3 | 228 | 89.6 |
| 4 | 219 | 93.5 |
| 5 | 213 | 94.3 |
| 6 | 198 | 93.7 |

These data readily demonstrate that the oxidative chlorination process can be conducted at advantageously lower temperatures with the catalyst prepared by the process of the invention. In addition, significantly higher conversions of HCl can be obtained at such lower temperatures with the catalyst prepared with methanol rather than water.

EXAMPLE III

Another typical catalyst (Catalyst No. 1) containing cupric chloride as the essential ingredient was prepared as follows:

Three hundred forty-two parts of cupric chloride ($CuCl_2 \cdot 2H_2O$), 68.1 parts of cobalt chloride

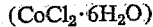

($CoCl_2 \cdot 6H_2O$)

and 20.4 parts of ferric chloride ($FeCl_3 \cdot 6H_2O$) were dissolved in 950 parts of hot water. The solution was brought to a boil and 1200 parts of activated alumina was added while the whole was stirred vigorously. The mixture was boiled slowly while it was stirred constantly for about thirty minutes. The supernatant liquid was then poured off and the remaining solids were dried overnight under vacuum at 60° C.

A second batch of catalyst (Catalyst No. 2) was prepared in a somewhat similar manner except that the 342 g. of $CuCl_2 \cdot 2H_2O$, 68.1 g. of $CoCl_2 \cdot 6H_2O$ and 20.4 g. of $FeCl_3 \cdot 6H_2O$ were dissolved in methanol, the solution was diluted to one liter with methanol, and then the 1200 g. of alumina (−48+100 mesh) was added to this solution. During addition of the alumina the suspension was stirred vigorously and thoroughly mixed. The resulting impregnated solids were dried at room temperature in air.

The two catalysts were tested in separate runs in a small glass reactor about 1 ft. long and 64 mm. in inside diameter adapted to contain about 600 g. of the catalyst. The reactor was jacketed and heated electrically by means of wire wrapped around the outside of the jacket. Hydrogen chloride, ethylene and oxygen (as air) in the molecular ratio of 2:1:0.55 were fed into the bottom of the reactor through a fritted glass distributor at rates of 6.94, 3.47 and 9.09 s.c.f.h., respectively. Contact time between reactants and catalyst in the fluidized system was approximately 1.5 seconds. Pressure in the reactor was substantially atmospheric.

The effluent gaseous product from the reactor was handled as described in Example I for recovery of the dichloroethane and conversions were calculated in the same manner.

A number of runs were made at various temperatures with each of the two catalysts being tested. Results of these are recorded in Table I.

*Table I*

| Catalyst No. 1 | | | Catalyst No. 2 | | |
|---|---|---|---|---|---|
| Run No. | Temp., °C. | Conversion, percent | Run No. | Temp., °C. | Conversion, percent |
| 1 | 240 | 76 | 1 | 239 | 89 |
| 2 | 256 | 78 | 2 | 252 | 91 |
| 3 | 269 | 81 | 3 | 258 | 92 |
| 4 | 280 | 82 | 4 | 270 | 89 |
| 5 | 300 | 78 | 5 | 300 | 79 |
| 6 | 310 | 76 | | | |

From these data, it will be seen that significantly higher conversions of HCl to dichloroethane can be obtained at comparable temperatures using the catalyst prepared from methanolic solution and that optimum conversion with the catalyst of the invention can be obtained at lower temperatures than those required when using the catalyst representative of the conventional ones used for this reaction.

Although the invention has been described with respect to two specific cupric chloride catalysts, it is not to be considered as restricted thereto. The method of catalyst preparation is equally applicable in cases where the active ingredient of the catalyst is a cupric halide other than cupric chloride, for example, cupric bromide or cupric fluoride, although such catalysts are generally somewhat less effective. Catalysts containing various amounts of cupric chloride on alumina or composite catalysts containing varying amounts of cupric chloride together with other metal chlorides such as those of tin, cadmium, antimony, the alkali metal and alkaline earth metals, and the like deposited on alumina may be prepared by the method described and will be characterized by increased efficiency and/or optimum operability at lower temperatures than those presently known to the art.

Neither is the invention to be considered as restricted to the use of methanol alone as the alcoholic solvent. Equally suitable in many instances is any alkyl alcohol containing from 1 to 8 carbon atoms such as ethanol, propanol, isopropanol, n-butanol, isobutanol, and the like.

Likewise, conditions under which the oxidative chlorination reaction is conducted with the cupric halide catalysts may be varied considerably from those exemplified without departing from the scope of the invention. In addition to ethylene, for example, a number of other unsaturated organic compounds may be chlorinated, e.g., propylene, butene-1, butene-2, pentene-1, pentene-2, 3-methyl-butene-1, 1-methyl-butene-2, 2-methyl-butene-3, hexene-1, hexene-2, 4-methyl-pentene-1,3, 3-dimethyl-butene-1, 4-methyl-pentene-2, octene-1, cyclopentene, cyclohexene, 3-methyl cyclohexene, butadiene-1,3, pentadiene-1,3, pentadiene-1,4, hexadiene-1,4, hexadiene-1,3, acetylene, propyne, butyne-1, pentyne-2, hexyne-1, etc. and their homologs and analogs. Halogenated unsaturated organic compounds containing one or more halogen atoms and one or more olefinic and/or acetylenic linkages may also be chlorinated using the catalysts of the invention. Among such may be mentioned, for example, vinyl halides, allyl halides, 2-halo-propylene, crotyl halides, 2-halo-butene-1, methallyl halides, 2-halo-butene-2, monohalogenated acetylenes, 1,1-dihaloethylene, 3-halo-pentene-1, 3-halo-cyclopentene and 3-halo-cyclohexene, 3-halo-pentadiene-1,4 and the like, their homologs and analogs.

Saturated hydrocarbons such as methane, ethane, propane, n-butane, isobutane, and the like may also be chlorinated by using the oxidative chlorination technique. Higher temperatures generally are required for these hydrocarbons than for the corresponding unsaturated materials. The hydrocarbons and other compounds mentioned may be treated individually or as mixtures with each other. When mixtures of saturated and unsaturated hydrocarbons are employed, it is also possible to selectively halogenate the one or the other by proper control of reaction conditions. The hydrogen chloride, oxygen, oxygen-containing gas or air, and organic compound to be chlorinated may be charged to the bottom of the reactor containing the catalyst in a finely divided state. The reactant gases then serve to fluidize the catalyst. The three reactants may be introduced into the reactor in separate streams or the air or oxygen may be introduced into the mixture of the hydrocarbon and hydrogen chloride. Because of the explosive limits of the various hydrocarbons, care should be taken not to allow a mixture of hydrocarbon and oxygen to reach reaction temperature in the absence of the hydrogen chloride. The use of a fluidized bed is preferred over the fixed bed, although the latter may be employed if desired. The minimum gas velocity required for fluidizing is low. Linear gas velocities of the order of 0.1 to 0.5 foot per second are generally satisfactory and avoid excessive carry-over of catalyst fines. A certain depth of catalyst in the reactor bed is necessary and this should be such as to permit a satisfactory fluidized condition of the catalyst to be achieved and to provide sufficient contact time for substantial conversion to the desired product at the temperature used. A superficial contact time of 0.5 to 10 seconds or more is sufficient under the usual operating conditions.

The relative proportions of hydrocarbon or halogenated organic compound, hydrogen chloride, and oxygen, air, or oxygen-bearing gas may be readily calculated. For the conversion of ethylene to dichloroethane, for example, reactant ratios are based on the following equations:

$$2HCl + \tfrac{1}{2}O_2 \rightarrow Cl_2 + H_2O$$
$$C_2H_4 + Cl_2 \rightarrow C_2H_4Cl_2$$
$$\overline{2HCl + C_2H_4 + \tfrac{1}{2}O_2 \rightarrow C_2H_4Cl_2 + H_2O}$$

The theoretical amount of oxygen required is thus 0.5 mole per two moles of hydrogen chloride. Stoichiometric quantities of the reactants for the particular reaction are usually employed but the equilibrium in the oxidation reaction may be shifted by employing excesses of one or other of the reactants. In the production of a saturated chlorinated compound from an unsaturated hydrocarbon, for example, a very slight excess of oxygen is preferred with the stoichiometric quantities of hydrocarbon to hydrogen chloride to oxygen being 1:2:0.55. When air is used instead of oxygen the preferred ratio of hydrocarbon:hydrogen chloride:air becomes 1:2:2.75. Other ratios may be employed, however, depending upon the particular catalyst employed and the product desired.

Generally, temperatures in the range from about 180° to about 450° C. may be employed. The particular preferential temperature within this permissible broad range will vary to some extent with the nature of the catalyst and the hydrocarbon reactant employed. In the oxidative chlorination of ethylene with a finely divided copper chloride-on-alumina catalyst prepared from methanolic solution according to the invention, conversions of HCl approaching 100% can be obtained with a temperature in the reaction zone as low as 180° C. and conversions of HCl of over 90% can be secured in the temperature range from 180–220° C. With the usual copper chloride catalysts, temperatures in the range from 200° C. to about 400° C. are specified to secure conversions of 90% and over and generally temperatures of about 225° C. to about 300° C. must be used to get conversions approaching 100%. When other salts are employed with the copper chloride, the operable temperature range is usually higher but here again the improved catalyst of the invention gives increased conversion at lower temperatures.

The invention is not limited to the execution of the hydrogen chloride oxidation reaction in the presence of an organic chlorine acceptor but may be applied as well in oxidation of hydrogen chloride when no acceptor is present, i.e., in the so-called Deacon reaction.

What is claimed is:

1. A method for the preparation of catalysts containing cupric chloride as the active catalytic agent deposited upon activated alumina which comprises dissolving cupric chloride in an alkyl alcohol containing from 1 to 8 carbon atoms, thoroughly admixing activated alumina with said solution, separating the solid material from the solution, and drying said solid material.

2. A method for the preparation of catalysts containing cupric chloride as the active catalytic agent deposited upon activated alumina which comprises dissolving cupric chloride in methanol, thoroughly admixing activated alumina with said solution, separating the solid material from the solution, and drying said solid material.

3. A method for the preparation of catalysts containing cupric chloride as the active catalytic agent deposited upon alumina which comprises dissolving 60 parts by weight of cupric chloride in 100 parts by weight of methanol, thoroughly admixing 175 parts by weight of activated alumina with said solution, separating the solid material from the solution, and drying said solid material.

4. The method of claim 3 wherein said drying is effected under vacuum at a temperature from about 50 to about 60° C.

5. A method for the preparation of a catalyst comprising cupric chloride as the active catalytic agent in combination with cobalt chloride and ferric chloride deposited upon activated alumina which comprises dissolving cupric chloride, cobalt chloride and ferric chloride in an alkyl alcohol containing from 1 to 8 carbon atoms, thoroughly admixing activated alumina with said solution, separating the solid material from the solution, and drying said solid material.

6. The method of claim 5 wherein said drying is effected under vacuum at a temperature from about 50 to about 60° C.

7. A method for the preparation of a catalyst comprising cupric chloride as the active catalytic agent in combination with cobalt chloride and ferric chloride deposited upon activated alumina which comprises dissolving 342 parts by weight of cupric chloride, 68.1 parts by weight of cobalt chloride and 20.4 parts by weight of ferric chloride in 800 parts by weight of methanol, thoroughly admixing 1200 parts by weight of activated alumina with said solution, separating the solid material from the solution, and drying said solid material.

References Cited in the file of this patent

UNITED STATES PATENTS

| | | |
|---|---|---|
| 2,293,705 | Bloch | Aug. 25, 1942 |
| 2,690,433 | Engel | Sept. 28, 1954 |
| 2,874,129 | Bell | Feb. 17, 1959 |